July 1, 1930.   L. D. OLIVER   1,768,922
MOLD
Filed March 26, 1927
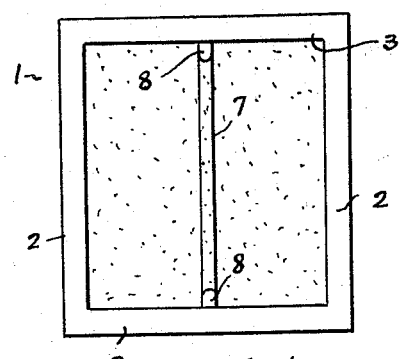
Fig. 1.
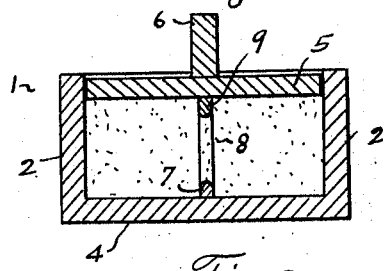
Fig. 2.
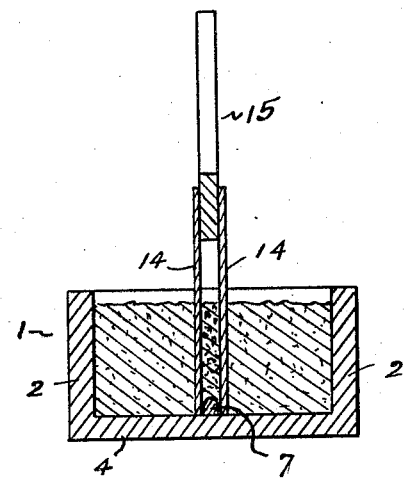
Fig. 3.
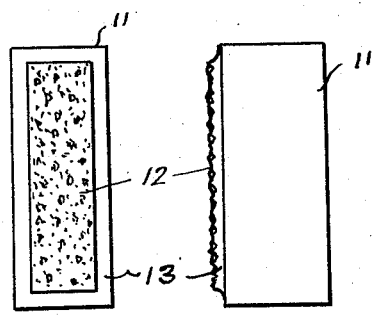
Fig. 4.
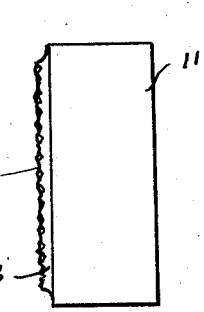
Fig. 5.
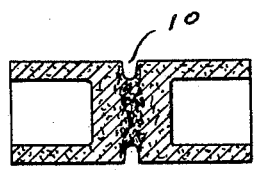
Fig. 6.
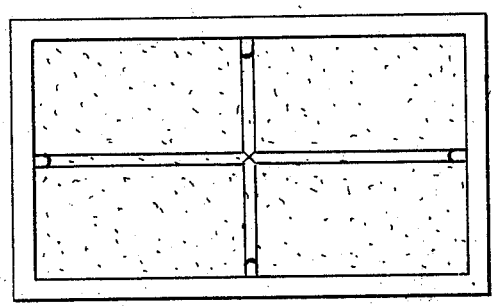
Inventor
Lott D. Oliver
By Hardway Cathey
Attorneys Patented July 1, 1930

1,768,922

UNITED STATES PATENT OFFICE

LOTT DAVE OLIVER, OF HOUSTON, TEXAS

MOLD

Application filed March 26, 1927. Serial No. 178,583.

This invention relates to new and useful improvements in a mold.

One object of the invention is to provide a mold for forming building units, such as brick, and is of such construction that a plurality of such units may be simultaneously molded with a weakened line between them along which the molded unit may be easily separated so as to provide each unit with a roughened face that may be exposed in erecting the units into a structure, in order to give the erected structure a novel and more ornamental appearance.

Another object of the invention is to provide a mold of the character described whereby provision is made for incorporating into the plastic material from which the units are molded and adjacent the weakened line thereof, a different material which will coalesce with said plastic material but which, when the units are broken apart, will accentuate the roughness of the broken surface and by means of which the broken surfaces of different units may be varied.

With the above and other objects in view this invention has particular relation to certain novel features of construction, arrangement of parts and use, an example of which is given in this specification and illustrated in the accompanying drawings, wherein:—

Figure 1 shows a plan view of the mold, with the cover removed.

Figure 2 shows a cross sectional view of the complete mold.

Figure 3 shows a cross sectional view thereof, showing means associated therewith for incorporating into the plastic material, adjacent the proposed weakened line of the molded unit, a different form of a material from that of which the main body of the unit is composed.

Figure 4 shows a face view of the molded building unit.

Figure 5 shows a side elevation thereof, and

Figure 6 shows a lengthwise sectional view of a modified form of building unit, which may be produced.

Referring now more particularly to the drawings, wherein like numerals of reference designate similar parts in each of the figures, the numeral 1 designates the mold box, as a whole, which has the sides 2, 2, the ends 3, 3, and the bottom 4. There is a top 5, for the mold box which is of a size to fit within the box 1 and which has an upstanding grip 6. Extending across the bottom 3, preferably midway between and parallel with the sides 2, there is an upstanding bottom rib 7 which is extended up the end walls 3, 3, forming the end ribs 8, 8, and the top 5 has a lengthwise depending rib 9 which aligns with the ribs 7 and 8, when the top is fitted within the box.

In use the required amount of concretious, or other plastic material from which the building units are formed, is poured into the mold box and the cover 5 is then placed therein and pressed downwardly to force said material into all parts of the mold and to compact the same and the material is then allowed to set and when it has sufficiently hardened the molded block may be removed from the mold and will have a surrounding groove, as 10, formed by the ribs 7, 8 and 9, which will so weaken the block that it may be easily broken into a plurality of brick, or building units, as 11, each having a roughened face, as 12, surrounded by a smooth marginal bevel, as 13, which will present a novel and ornamental surface when the units are erected into a structure with the roughened faces exposed.

In order to vary, or accentuate, the roughness of these broken faces, as is sometimes desired, the material adjacent the broken line may be varied. In order to accomplish this a supplemental mold has been provided comprising the spaced mold boards 14, 14, which are fixed in their relation to each other and have their upstanding handle 15. In use this supplemental mold may be inserted in the box 1 with one of said boards 14 on each side of the ribs 7, and 8. The plastic material from which the main body of the unit is to be composed is then poured into the box 1 on each side of the supplemental mold and the space between the boards 14, 14, then filled with a special plastic material, filled with coarse aggregate, glass particles, or other selected material, and the supplemental mold then withdrawn to allow all of the platsic material in the mold box 1 to coalesce into a unitary mass, and the cover 5 is then applied as, and with the results hereinabove explained.

What I claim is:

1. The combination with a mold box having projecting means across the bottom and the adjacent walls of the box, of spaced removable partitions disposed one on each side of said means.

2. The combination with a mold box having an inside rib across its bottom which is extended across the adjacent walls of the box, of spaced partitions arranged one on each side of said rib, said partitions being removable.

3. The process of forming brick from a molded unit of plastic material which consists in molding said plastic material in a mold box into separate bodies of the form of the ultimate brick to be produced with said bodies spaced apart, and molding into the space between said bodies a different plastic material, and permitting the material of said bodies, and the different material between them to coalesce, while said materials are plastic.

4. The process of forming brick from a molded unit of plastic material which consists in molding said plastic material in a mold box into separate bodies of the form of the ultimate brick to be produced with said bodies spaced apart, then molding into the space between said bodies a different plastic material, then permitting the material of said bodies, and the different material between them to coalesce, while said materials are plastic, forming weakened lines of cleavage defining the said ultimate brick, permitting said material to set and then separating the brick along said weakened lines.

In testimony whereof I have signed my name to this specification.

LOTT DAVE OLIVER.